(12) United States Patent
Rahman et al.

(10) Patent No.: US 8,274,895 B2
(45) Date of Patent: Sep. 25, 2012

(54) DYNAMIC MANAGEMENT OF NETWORK FLOWS

(75) Inventors: Shahriar I. Rahman, San Jose, CA (US); Allwyn Carvalho, Alameda, CA (US); Vamsidhar Valluri, Fremont, CA (US); Manoj Kumar Tiwari, Santa Clara, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 240 days.

(21) Appl. No.: 12/360,080

(22) Filed: Jan. 26, 2009

(65) Prior Publication Data

US 2010/0188976 A1    Jul. 29, 2010

(51) Int. Cl.
*G01R 31/08*    (2006.01)
(52) U.S. Cl. ......................................................... 370/235
(58) Field of Classification Search ........... 370/235–240
See application file for complete search history.

(56) References Cited

U.S. PATENT DOCUMENTS

| 7,254,114 B1 | 8/2007 | Turner et al. |
| 7,290,283 B2 | 10/2007 | Copeland |
| 2004/0054680 A1* | 3/2004 | Kelley et al. .................. 707/100 |
| 2005/0278431 A1 | 12/2005 | Goldschmidt et al. |
| 2007/0177600 A1 | 8/2007 | Suzuki et al. |
| 2007/0217335 A1* | 9/2007 | Jayaraman et al. ........... 370/235 |
| 2009/0141638 A1 | 6/2009 | Dolisy |

OTHER PUBLICATIONS

B. Claise, ED., "Specification of the IP Flow Information Export (IPFIX) Protocol for the Exchange of IP Traffic Flow Information", Network Working Group, Request for Comments: 5101, Category: Standards Track, Cisco Systems, Inc., Jan. 2008, 63 pages.
"Introduction to Cisco IOS® NetFlow", Technical Overview, Cisco Systems, Inc., Oct. 2007, 17 pages.
"Protecting the Network from Denial of Service Floods", Implementation Guide, Juniper Networks, Inc., Jun. 2008, 28 pages.

* cited by examiner

*Primary Examiner* — Kwang B Yao
*Assistant Examiner* — Tung Q Tran
(74) *Attorney, Agent, or Firm* — Blakely Sokoloff Taylor & Zafman, LLP

(57) ABSTRACT

A plurality of flow network elements monitors network flows at the subscriber level for a plurality of subscribers. The flow network elements export flow records to a collector, which organizes the flow records. A policy client correlates the flow records and determines whether any network flows are violating a flow policy definition. If a flow policy definition is violated, the policy client transmits a policy action to a policy server which indicates what action to take for a given violating flow. The policy server assigns a flow policy for the subscriber corresponding with the violating flow. The assigned flow policy is then transmitted to the flow network element having that violating flow, and that flow network element installs the flow policy.

24 Claims, 8 Drawing Sheets

| POLICY DEFINITION STRUCTURE 324 | | |
| --- | --- | --- |
| NAME 710 | RULE 720 | POLICY ACTION 730 |
| DoS Attack | N SYN transmitted/second | Drop All Packets from IP address |
| DoS Victim | N SYN received/second | Filter out TCP Syn packets |
| Spam | N SMTP transmitted/second | Bring down Subscriber |

DYNAMIC MANAGEMENT OF NETWORK FLOWS

BACKGROUND

1. Field

Embodiments of the invention relate to the field of network processing; and more specifically, to dynamic management of network flows.

2. Background

Network flow mechanisms provide statistics on packets flowing through network equipment (e.g., routers). A network flow is a series of packets, typically transmitted from one point to another point (e.g., one IP address to another IP address, one port to another port, label switching, etc.) during a certain interval of time. A network flow can be defined in many ways. Typically, all packets belonging to a particular flow have a set of common properties. For example, the common properties may include the same packet header fields (e.g., source IP address and/or destination IP address), transport header fields (e.g., source UDP or TCP port and/or destination UDP or TCP port), application header fields (e.g., Real Time Protocol (RTP) header fields), one or more characteristics of the packet (e.g., number of MPLS labels, etc.), and/or one or more fields derived from packet treatment (e.g., next hop IP address, output interface, etc.).

Several IP flow measurement and export technologies exist to monitor flows at the port level or virtual router level and provide statistics at various network level entities. Typically in such network flow mechanisms, one or more routers monitor packets flowing on a port and/or a virtual router, and send flow records to a remote device for collection and further processing. The routers may output the flow records in numerous situations. For example, a router may output a flow record when it determines that a corresponding flow is finished. Determining that a flow is finished may be accomplished by flow aging (e.g., the router maintains an aging counter or each flow and when the router observes new traffic for an existing flow it resets the aging counter). As another example, TCP session termination in a TCP flow may cause the router to export the corresponding flow record. As yet another example, routers may be configured to output flow records at fixed intervals even if the flows are still ongoing. Statistics about specific routers, or multiple routers (e.g., a network view) may be obtained from the stored statistics in the remote device. Flow records are not typically maintained at the subscriber level.

BRIEF DESCRIPTION OF THE DRAWINGS

The invention may best be understood by referring to the following description and accompanying drawings that are used to illustrate embodiments of the invention. In the drawings:

FIG. 7 illustrates an exemplary policy definition structure according to one embodiment of the invention.

DETAILED DESCRIPTION

Figure 1:
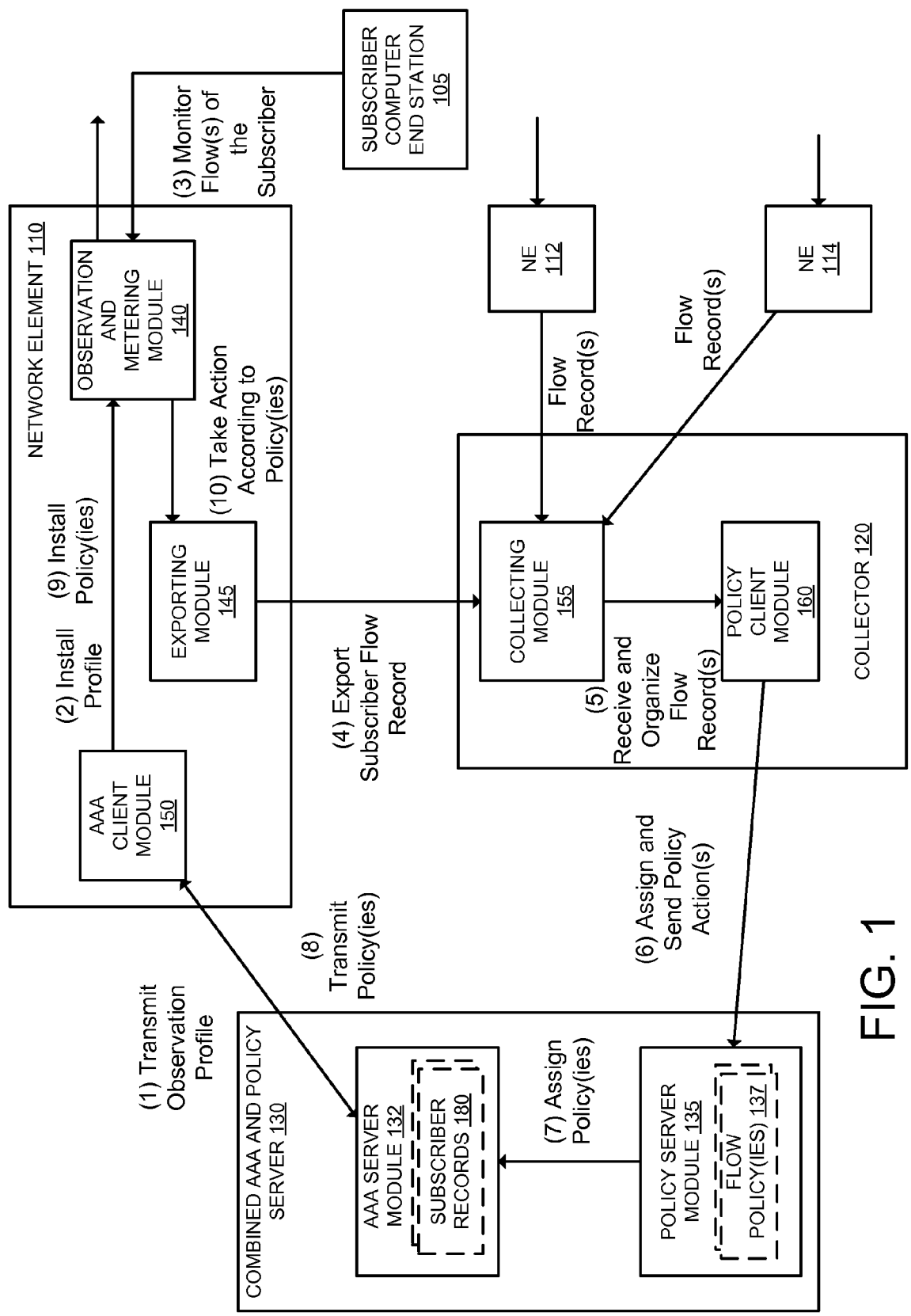
FIG. 1 is a data flow diagram illustrating an exemplary network flow management system according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more electronic devices (e.g., a computer end station, a network element, etc.). Such electronic devices store and communicate (internally and/or with other electronic devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, one or more user input/output devices (e.g., a keyboard, a touchscreen, and/or a display), and a network connection. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, computer end stations, etc.). Some network elements are "multiple services network elements" that provide support for multiple networking functions (e.g., routing, bridging, switching, Layer 2 aggregation, and/or subscriber management), and/or provide support for multiple application services (e.g., data, voice, and video). Subscriber computer end stations (e.g., workstations, laptops, palm tops, mobile phones, smartphones, multimedia phones, portable media players, GPS units, gaming systems, set-top boxes, etc.) access content/services provided over the Internet and/or content/services provided on virtual private networks (VPNs) overlaid on the Internet. The content and/or services are typically provided by one or more server computer end stations belonging to a service or content provider, and may include public webpages (free content, store fronts, search services, etc.), private webpages (e.g., username/password accessed webpages providing email services, etc.), corporate networks over VPNs, etc. Typically, subscriber computer end stations are coupled (e.g., through customer premise equipment coupled to an access network (wired or wirelessly)) to edge network elements, which are coupled (e.g., through one or more core network elements to other edge network elements) to the server computer end stations.

Some network elements support the configuration of multiple contexts. As used herein, each context includes one or more instances of a virtual network element (e.g., a virtual router, virtual switch, or a virtual bridge). Each context typically shares system resources (e.g., memory, processing cycles, etc.) with other contexts configured on the network element, yet is independently administrable. For example, in the case of multiple virtual routers, each of the virtual routers may share system resources but is separate from the other virtual routers regarding its management domain, AAA (authentication, authorization, and accounting) name space, IP address, and routing database(es). Multiple contexts may be employed in an edge network element to provide direct network access and/or different classes of services for subscribers of service and/or content providers. As another example, in the case of multiple virtual switches, each virtual switch may share system resources but each virtual switch maintains its own forwarding table, which, for example, may be used to map Media Access Control (MAC) addresses to virtual circuits.

Within certain network elements, multiple "interfaces" may be configured. As used herein, each interface is a logical entity, typically configured as part of a context, which provides higher-layer protocol and service information (e.g., Layer 3 addressing) and is independent of physical ports and physical circuits. AAA (authentication, authorization, and accounting) may be provided through an internal or external server, such as a RADIUS (Remote Authentication Dial-In User Service) or DIAMETER server. The server provides subscriber records for subscribers that identify, among other subscriber configuration requirements, to which context (e.g., which of the virtual routers) the corresponding subscribers should be bound within the network element. As used herein, a binding forms an association between a physical entity (e.g., port, channel, etc.) or a logical entity (e.g., interface, virtual circuit, subscriber circuit, etc.) with a higher-layer protocol interface over which network protocols (e.g., routing protocols, bridging protocols) are configured for a given context. Subscriber data flows on the physical entity when some higher-layer protocol interface is configured and associated with that physical entity. By way of a summary example, subscriber computer end stations may be coupled (e.g., through an access network) through a multiple services edge network element (supporting multiple contexts (e.g., multiple virtual routers), interfaces, and AAA) coupled to core network elements coupled to server computer stations of service/content providers, Further, AAA processing is performed to identify the subscriber record for a subscriber, that subscriber record identifies one or more virtual routers in the network element to which that subscriber's traffic should be bound, and the physical entity carrying that subscriber's traffic (e.g., the circuit) is bound to an interface of that virtual router.

A method and apparatus for a network flow management system is described. In one embodiment of the invention, the network flow management system includes a flow network element coupled with a combined AAA and policy server and a collector. The flow network element monitors network flows at various observation point levels, including at the subscriber level. The flow network element exports subscriber flow records to the collector. The collector organizes those records and a policy client assigns policy actions for the subscriber based on policy definitions. The policy actions are transmitted to the combined AAA and policy server, which assigns one or more policies to the subscriber and transmits those policies to the flow network element. The flow network element applies those policies to the subscriber traffic.

FIG. 1 is a data flow diagram illustrating an exemplary network flow management system 100 according to one embodiment of the invention. The network flow management system 100 includes the flow network elements 110, 112, and 114, each coupled with the collector 120, and the combined AAA and policy server 130, which is coupled with the flow network element 110 and the collector 120. As used herein, a flow network element is a network element that participates in a network flow management system and observes flows. The subscriber computer end station 105 is coupled with the flow network element 110. While in one embodiment of the invention the network elements 112 and 114 are also coupled with the combined AAA and policy server 130, in alternative embodiments of the invention the network elements 112 and 114 are coupled with a different combined AAA and policy server. It should be understood that the number of flow network elements, the number of collectors, and the number of combined AAA and policy servers illustrated in FIG. 1 are exemplary, and any different numbers of flow network elements, collectors, and/or combined AAA and policy servers may be used in embodiments of the invention described herein.

The flow network element 110 includes the authentication, authorization, and accounting (AAA) client module 150, the observation and metering module 140, and the exporting module 145. The flow network element 110 terminates subscribers (a subscriber is an end user of service). For example, the flow network element 110 terminates the traffic of the subscriber computer end station 105. Thus, subscriber network traffic is received at the network element 110 and transmitted by the network element 110. The subscribers may be fixed subscribers (e.g., DHCP, L2VPN, CLIPS, PPP, PPPoE, VOIP, L2TP, etc.) and/or mobile subscribers (e.g., mobile IP, WiFi, WiMAX, GSM, CDMA, etc.). The flow network element 110 includes a subscriber record for each subscriber. For example, the flow network element 110 will include a subscriber record corresponding to the subscriber computer end station 105. A subscriber record defines a set of attributes associated with the subscriber, including a subscriber identifier (e.g., username, email address, etc.), password, authentication, access control, rate-limiting, and policing information. The AAA client module 150 typically requests a subscriber record from a combined AAA and policy server (e.g., the combined AAA and policy server 130) during an initial connection request from a subscriber, or during a reauthorization request from that subscriber. The AAA client module 150 also performs accounting updates in connection with the combined AAA and policy server.

The flow network element 110 includes the concept of a subscriber circuit. A subscriber circuit is a logical construct that uniquely identifies a subscriber session within the flow network element 110, and typically exists for the lifetime of the session. Typically, subscribers are assigned to a specific subscriber circuit during an initial authentication. Thus, after being authenticated, the subscriber computer end station 105 will be assigned to a subscriber circuit identifiable with a subscriber circuit identifier.

The observation and metering module 140 monitors network flows at observation points. An observation point may be a subscriber circuit (e.g., monitoring the flows associated with a subscriber), an identified flow within a subscriber circuit, a logical circuit (a group of subscriber circuits), a virtual router, a context, a physical port, etc. The observation and metering module 140 is programmed with observation points according to observation profiles. An observation profile indicates the network flow monitoring parameters to take for a particular subscriber. For example, an observation profile may include a flow definition map that indicates the network flow(s) to monitor (e.g., type of network flow such as data, voice, or video, a group of applications, a specific application type such as VoIP, video on demand, VPN, IPTV, P2P, FTP, etc., or a sub-application (e.g., traffic from or sent to a specific IP address in an application type)), and/or the observation point(s) to program for that subscriber. Typically for a single subscriber, the observation profile will indicate that a single subscriber-level observation point be programmed on the subscriber circuit assigned to that subscriber.

The monitored flow information is passed to the exporting module 145, which is coupled with the observation and metering module 140. The exporting module periodically exports the monitored flow information (e.g., as flow record(s)) to the collector 120. As used herein, a flow record includes information about a specific flow that was observed at an observation point. The flow record may contain measured properties of the flow (e.g., the number of bytes and packets observed in the flow, etc.) and/or characteristic properties of the flow (e.g., source IP address, destination IP address, timestamps for flow start and finish, layer 3 routing information (e.g., nexthop IP address, source and destination IP masks), etc.).

The collector 120 includes the collecting module 155 and the policy client module 160. The collecting module 155 collects flow data (e.g., flow records) from the flow network elements (e.g., the flow network elements 110, 112, and 114), organizes the flow data, and may filter that data. The organized data will be stored on the collector for a certain amount of time and is used by the policy client module 160 to determine whether to assign a policy action to a certain flow.

The combined AAA and policy server 130 includes the AAA server module 132, the subscriber records 180, the policy server module 135, and the flow policies 137. The AAA server module 132 receives, and responds to, AAA messages from the flow network elements. For example, the AAA server module 132 may receive an authentication request for a subscriber (e.g., from the AAA client module 150) and respond with attributes for that subscriber's connection (e.g., access control, rate-limiting, policing information, etc.). The policy server module 135 assigns policies to subscribers based on received policy actions and the flow policies 137, which will be described in greater detail later herein.

The operations of FIG. 1 will be described such that the subscriber corresponds with the subscriber computer end station 105. At operation 1, the AAA server module 132 transmits an observation profile for the subscriber to the network element 110. According to one embodiment of the invention, operation 1 is performed in response to an initial authentication request from the subscriber (e.g., in response to a connection request from the subscriber computer end station 105). For example, upon the AAA client module 150 receiving the initial authentication request from a subscriber, the AAA client module 150 transmits an authentication request to the AAA server module 132 in the combined AAA and policy server 130. In one embodiment of the invention, the AAA client module 150 includes an observation profile request for that subscriber along with the authentication request. In another embodiment of the invention, the AAA server module 132 will respond with an observation profile for the subscriber (if one is associated with that subscriber) regardless of whether the AAA client module 150 explicitly requests the observation profile. In another embodiment of the invention, operation 1 is performed sometime after the subscriber has been initially authorized.

Figure 4:
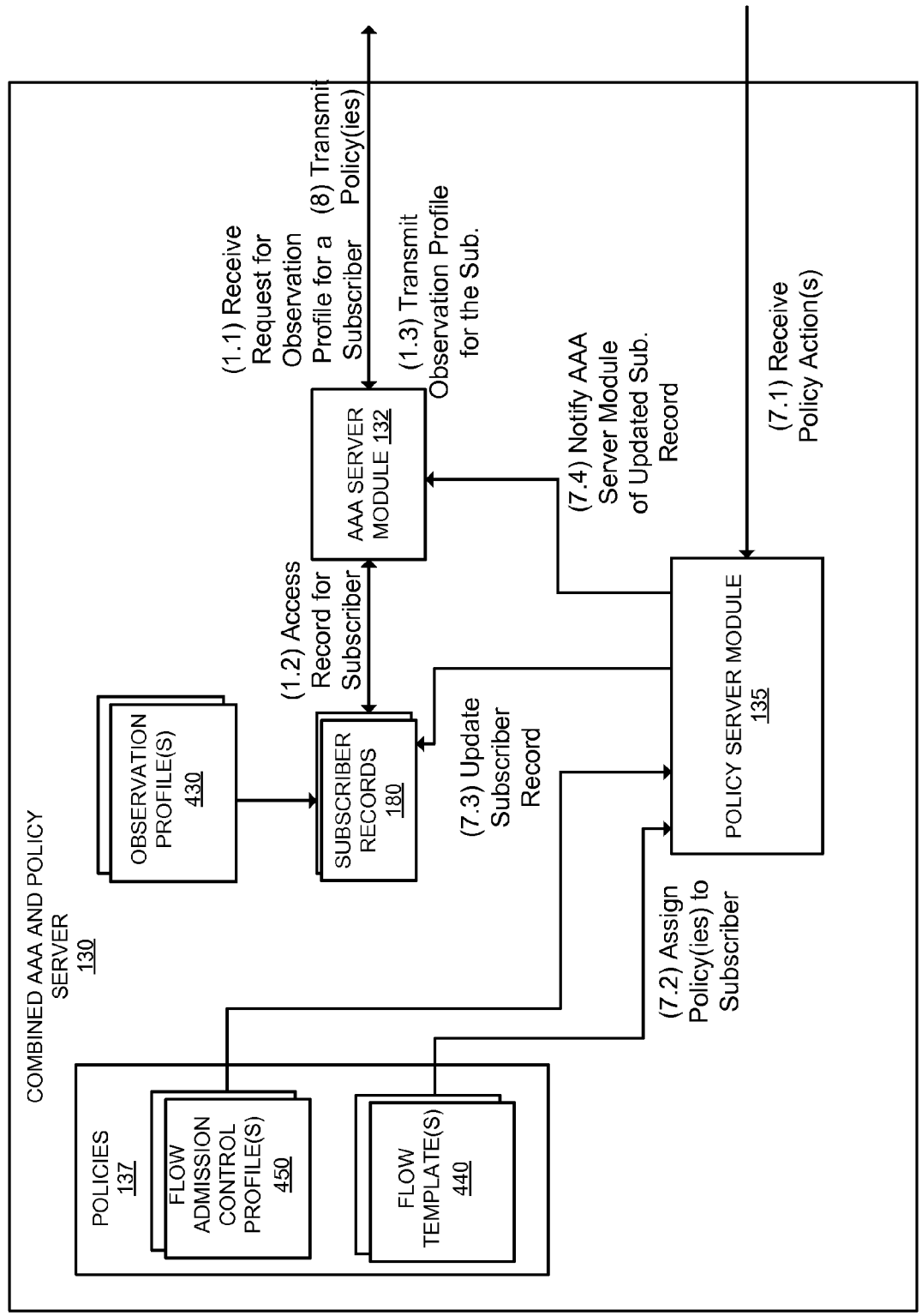
FIG. 4 is a data flow diagram illustrating an exemplary combined AAA and policy server to be used in the network flow management system according to one embodiment of the invention.

FIG. 4 is a data flow diagram illustrating an exemplary embodiment of the combined AAA and policy server 130 of the network flow management system 100 according to one embodiment of the invention. The operations in FIG. 4 correspond with the operations described in FIG. 1. In addition, certain operations described in reference to FIG. 1 have been expanded in FIG. 4. For example, operation 1 described in FIG. 1 corresponds with operations 1.1, 1.2, and 1.3 of FIG. 4. As illustrated in FIG. 4, the combined AAA and policy server 130 includes the AAA server module 132, the policy server module 135, the subscriber records 180, one or more observation profiles 430, and the flow policies 137 (which includes one or more flow admission control profiles 450 and one or more flow templates 440).

With reference to FIG. 4, at operation 1.1, the AAA server module 132 receives a request from the AAA client module 150 for an observation profile for a specific subscriber (e.g., corresponding with the subscriber computer end station 105). The request identifies the subscriber by a unique subscriber identifier (e.g., a telephone number, email address, username/password combination, etc.). At operation 1.2, the AAA server module 132 accesses the subscriber records 180 to access the subscriber record corresponding to the subscriber identifier included in the request. Each subscriber record may include an observation profile or alternatively be associated with an observation profile. The observation profile(s) 430 are stored within the combined AAA and policy server. Different observation profiles may instruct the flow network elements to monitor different observation points and/or different flows. According to one embodiment of the invention, the observation profile(s) 430 are defined by an operator of the network flow management system 100 and are applied to different ones of the subscriber records 180. According to one embodiment of the invention, an observation profile is applied to a particular subscriber record dynamically based on the identity of the subscriber (e.g., based on the type of subscriber, the service level of the subscriber, the service provider providing service to that subscriber, etc.). According to one embodiment of the invention, if attributes of the subscriber change (e.g., the subscriber changes their level of service), the observation profile may be dynamically updated and supplied to the flow network element 110.

Assuming that there is a subscriber record for the subscriber, and the subscriber record indicates an observation profile is associated with the subscriber, the AAA server module 132 transmits that observation profile to the AAA client module 150 of the flow network element 110 at operation 1.3. In one embodiment of the invention, the subscriber record for the subscriber is transmitted to the AAA client module 150 along with the observation profile (e.g., the observation profile is included in the subscriber record), while in another embodiment of the invention only the observation profile is transmitted to the AAA client module 150. The observation profile is transmitted along with the subscriber identifier.

Figure 2:
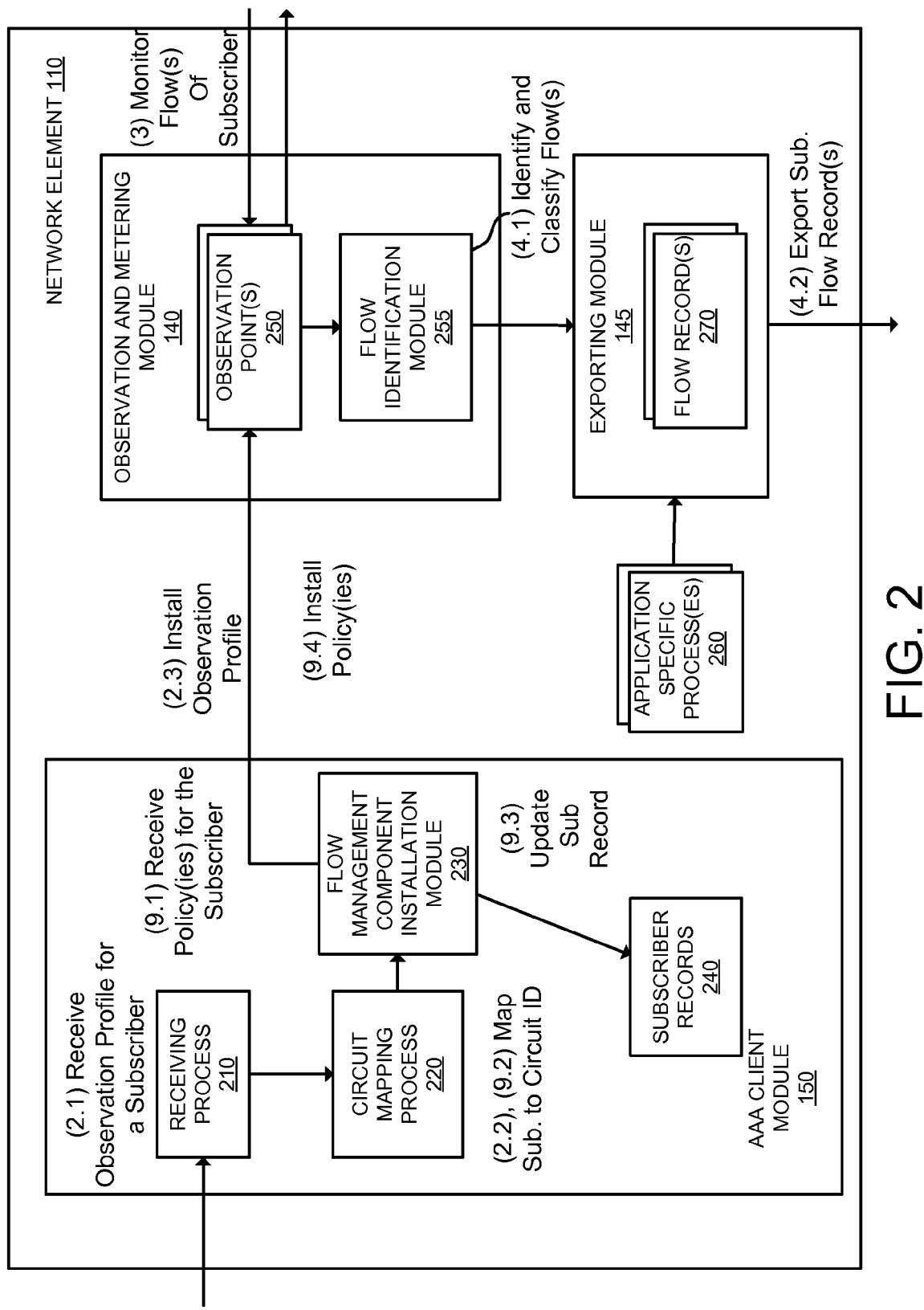
FIG. 2 is a data flow diagram illustrating an exemplary flow network element to be used in the network flow management system according to one embodiment of the invention.

With reference to FIG. 1, the AAA client module 150 receives the observation profile, and at operation 2, installs that profile. FIG. 2 is a data flow diagram illustrating an exemplary embodiment of the flow network element 110 of the network flow management system 100 according to one embodiment of the invention. The flow network element 110 includes the AAA client module 150, coupled with the observation and metering module 140, which is coupled with the exporting module 145. The AAA module further includes the receiving process 210, the circuit mapping process 220, the flow management component installation module 230, and the subscriber records 240. The observation and metering module 140 includes one or more programmed observation points 250, and the flow identification module 255. The exporting module 145 includes one or more flow records 170. Additionally, the flow network element 110 includes one or more application specific processes 260 (e.g., VoIP process, VoD process, IPTV process, P2P process, etc.) that provide application specific requirements to the exporting module 145.

At operation 2.1, the receiving process 210 receives the observation profile for the subscriber transmitted from the combined AAA and policy server 130. As described above, the observation profile is transmitted along with the subscriber identifier. At operation 2.2, the circuit mapping process 220 maps that subscriber identifier to a circuit identifier (the circuit identifier identifies the subscriber circuit associated with that subscriber). After the subscriber circuit for that subscriber is identified, the observation profile is passed to the flow management component installation module 230 for installation. The flow management component installation module 230 determines whether that observation profile is supported on the flow network element 110. If the observation profile is not supported, the flow management component installation module 230 takes alternative action (e.g., raising an alarm to display an error message, notifying the combined AAA and policy server 130 of the error, drop the packet without further processing, etc.). If the observation profile is supported, at operation 2.3, the flow management component installation module 230 installs that observation profile by programming one or more observation points 250 for the subscriber based on the observation profile.

Figure 5:
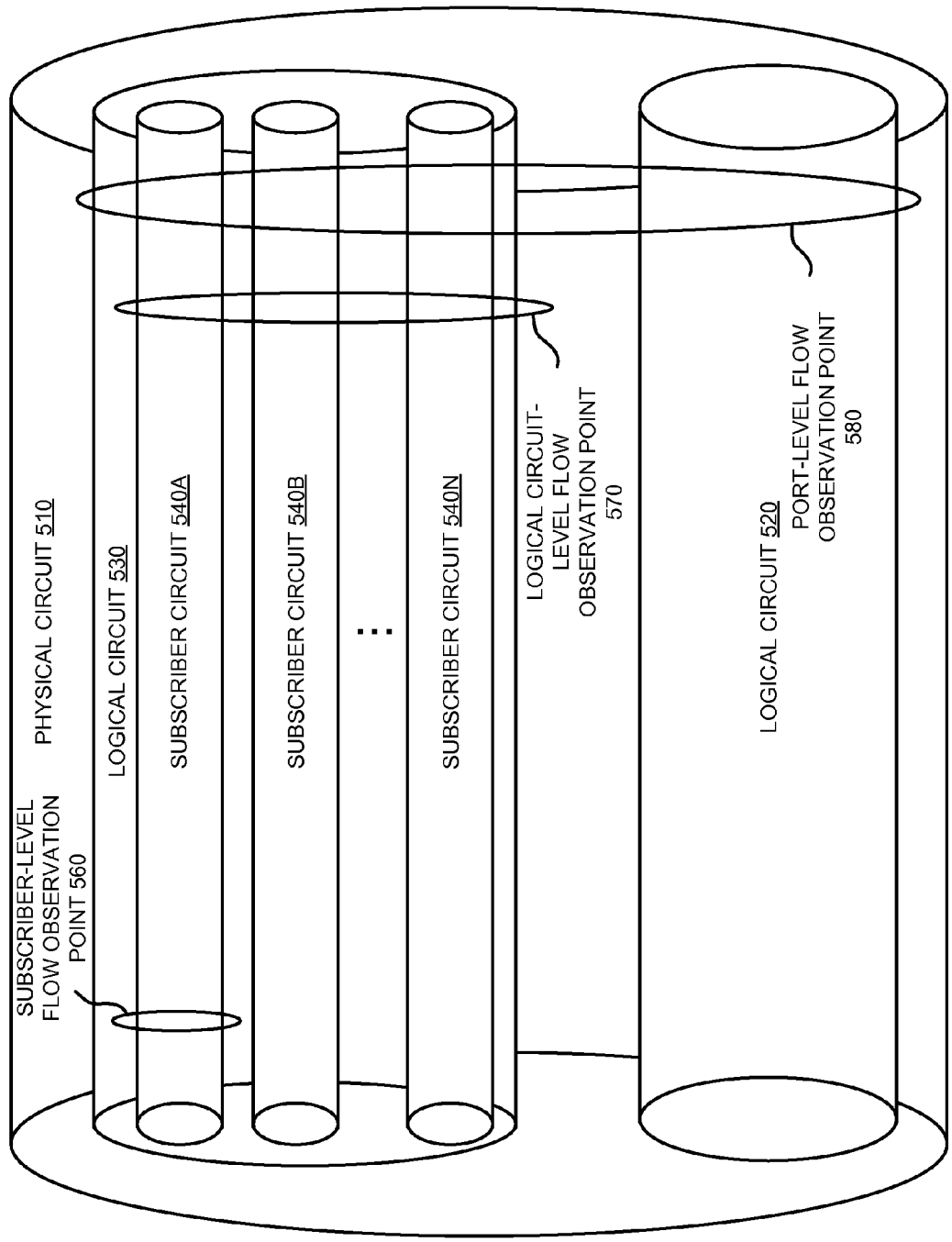
FIG. 5 illustrates various layers of observation points of a network flow management system according to one embodiment of the invention.

As previously described, the observation point(s) 250 may be programmed at different levels. FIG. 5 illustrates various levels of observation points that can be used in the network flow management system 100 according to one embodiment of the invention. The flow network element 110 includes multiple physical ports (e.g., ports on a line card) each capable of having only a single physical connection with another network element. Each physical connection may be an observation point. In addition, within each physical connection, there may exist one or more logical circuits. Each of these logical circuits can also be an observation point (this is referred to as observing at the logical circuit level). Each of the logical circuits may include one or more subscriber circuits, each of which can be an observation point (this is referred to as observing at the subscriber level).

The physical layer circuit 510 (e.g., a VLAN circuit, a QinQ circuit, a Permanent Virtual Circuit (PVC), a Switched Virtual Circuit (SVC), a Data Link Connection Identifier (DLCI) circuit, etc.) includes the logical circuits 520 and 530, and the logical circuit 530 includes the subscriber circuits 540A-540N. Each of the subscriber circuits may be separately monitored (e.g., the subscriber-level flow observation point 560), each logical circuit may be separately monitored (e.g., the logical circuit-level observation point 570), and/or the physical circuit 510 may be monitored (e.g., the port-level flow observation point 580). It should be understood that a single subscriber-level flow observation point 560 applies to a single subscriber (that is, a subscriber-level flow observation point is unique to a particular subscriber). The observation profile for the subscriber corresponding with the subscriber computer end station 105 indicates that an observation point should be placed on the subscriber circuit associated with the subscriber computer end station 105.

With reference back to FIG. 1, sometime after the observation profile is installed for that subscriber, at operation 3, the observation and metering module 140 monitors the flow(s) associated with that subscriber on the programmed observation point(s). It should be understood that the network traffic of the flow(s) may be ingress traffic, egress traffic, or bi-directional traffic (e.g., the traffic may be transmitted from the subscriber computer end station 105, destined for the subscriber computer end station 105, or both).

At operation 4 of FIG. 1, the exporting module 145 exports those monitored flow record(s) to the collector 120. The flow record(s) may be exported with different protocols in different embodiments of the invention (e.g., using the IPFIX (IP Flow Information Export) protocol, defined in RFC (Request for Comments) 5101, "Specification of the IP Flow Information Export (IPFIX) Protocol for the Exchange of IP Traffic Flow Information", January 2008, etc.). With reference to FIG. 2, the observed packets (at least the headers of the observed packets) are accessed by the flow identification module 255. The flow identification module 255 organizes the observed packets based on the identification of those packets. The flow identification module 255 may identify flows differently depending on the application corresponding to the flow. For example, for certain applications, the flow identification module 255 may determine flows by examining only the headers of the packets (e.g., source address, destination address, protocol type, etc.). For other applications, the flow identification module 255 may determine flows by examining the headers of the packets as well as additional information (e.g., device interface, control plane information, etc.).

In addition to identifying the flows, in one embodiment of the invention, the flow identification module 255 classifies the flows according to application type. For example, the flow identification module 255 may classify the flows depending on whether the application is a data application, a voice application, a video application, etc. As another example, the flow identification module 255 may classify the flows based on specific application types (e.g., VoIP, VoD, VPN, IPTV, P2P, FTP, etc.).

The flow identification module 255 creates the flow record(s) 270 based on the packets observed at the observation point(s) 250. According to one embodiment of the invention, the observation profile installed for a subscriber corresponding with the subscriber computer end station 105 indicates the type of packets the flow identification module 255 will create flow records for (e.g., the observation profile will include a flow definition map). For example, the flow identification module 255 may create flow records for a type of application (e.g., data applications, voice applications, and/or video applications), a specific application (e.g., VoIP, VoD, VPN, IPTV), or a sub-application (e.g., traffic received from certain sources, traffic sent to certain destinations, etc.). If a packet that was monitored on the observation point does not match one of the flow definition map then a flow record will not be created. The flow identification module 255 may further add a flow identifier to each of the flow record(s) 270.

According to one embodiment of the invention, the flow identification module 255 only creates flow records for packets as indicated by the observation profile for a particular subscriber (e.g., as indicated by the flow definition map in the observation profile). For example, if the observation profile indicates that the flow identification module 255 should only monitor VoIP packets for a particular subscriber, the observation profile will only create flow records for the VoIP packets associated with that subscriber (ingress or egress). All other packets associated with that subscriber that are not VoIP packets will not have a corresponding flow record.

The flow record(s) 270 are passed to the exporting module 145, which stores the flow record(s) 270 until they are transmitted to the collector 120. The flow record(s) 270 can be exported to the collector 120 in different ways in different embodiments of the invention including exporting at periodic intervals and/or event based exporting (e.g., based on flow aging, session termination, fixed intervals, export packet full (a packet which has reached its limit of flow records), etc.).

In addition, the exporting module 145 may aggregate the flow records (e.g., based on application type, etc.). For example, if a few seconds lapse between packets for a given application (e.g., the observation and metering module 140 has not received a VoIP packet for 15 seconds) this may trigger the exporting module 145 to export the flow records (the lapse may indicate that the flow is complete).

The application specific process(es) 260 may provide application specific rules for exporting the flow record(s) 270 (e.g., when to export records, the trigger to export records, etc.). In addition, the application specific process(es) 260 may add information to the flow record(s) 270 which are typically not available on the datapath. For example, a MobileIP process may add control statistics to the flow record(s) 270 such as the number of moves of the subscriber, failed re-registration attempts, etc.

It should be understood that each observation point may have different flow records. For example, if observing at the subscriber flow level (e.g., the subscriber-level flow observation point 560) the flow records will correspond only with that subscriber. In this case, the subscriber-level flow records include information identifying the subscriber the flow record belongs (e.g., the subscriber circuit identifier, subscriber identifier (e.g., username/password, email address, telephone number, etc.). As another example, if observing at the logical circuit flow level (e.g., the logical circuit-level flow observation point 570) the flows will correspond with that logical circuit (typically multiple subscribers). As yet another example, if observing at the port level, the flows will correspond with traffic monitored on that port (e.g., the port-level flow observation point 580).

Thus, at operation 4.1, the flow identification module identifies the flow(s) within the monitored traffic according to the observation profile and creates flow record(s) 270 for those identified flow(s). Sometime later, at operation 4.2, the exporting module 145 exports those created flow record(s) 270 to the collector 120.

In addition to exporting the flow record(s), in some embodiments of the invention the flow network element 110 transmits information to the collector specific to the flow network element 110. For example, the flow network element 110 may transmit the number of subscribers currently supported, the current bandwidth usage, etc.

Figure 3:
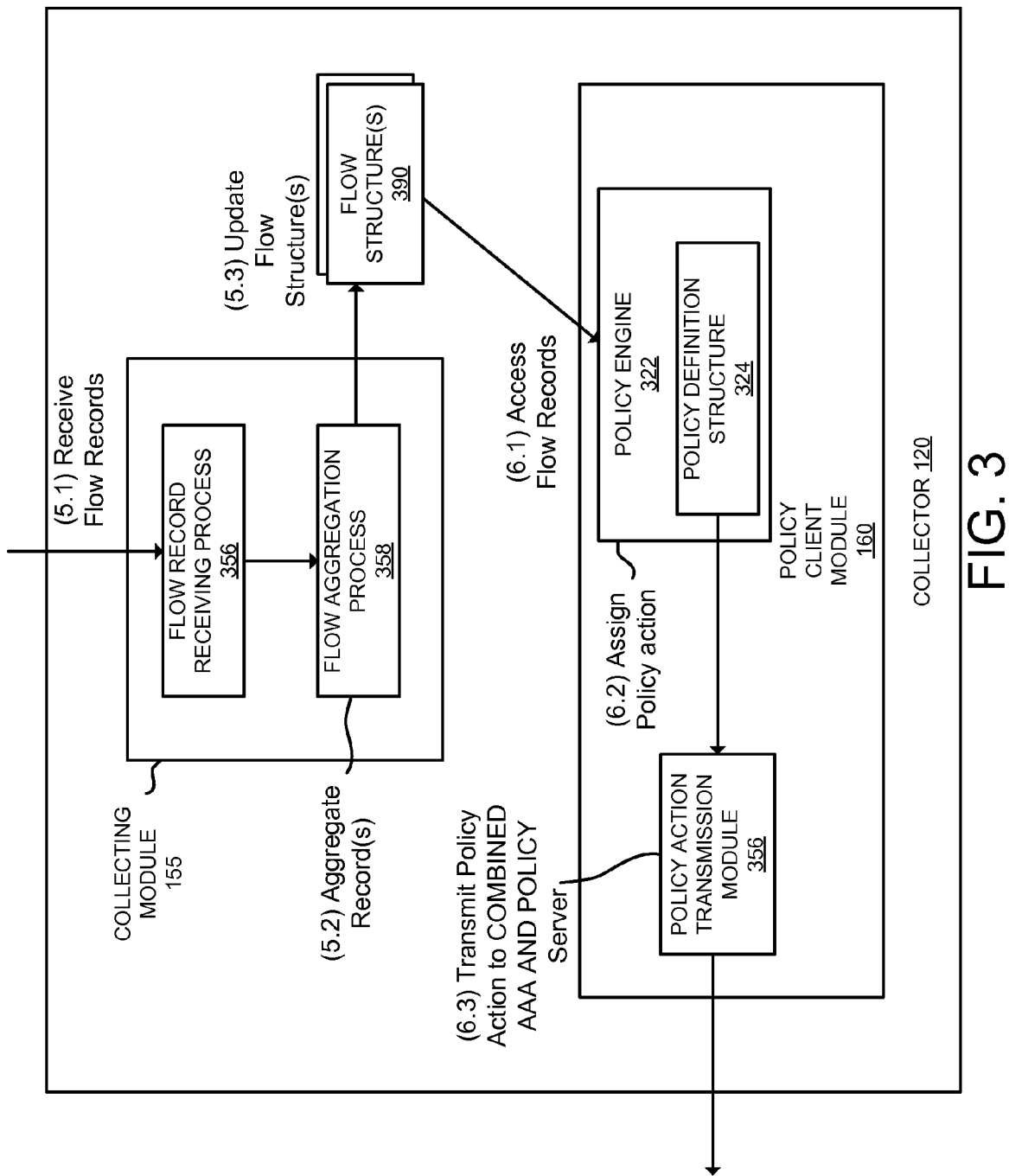
FIG. 3 is a data flow diagram illustrating an exemplary collector to be used in the network flow management system according to one embodiment of the invention.

Referring back to FIG. 1, at operation 5, the collector 120 receives and organizes the received flow record(s). FIG. 3 is a data flow diagram illustrating an exemplary embodiment of the collector 120 according to one embodiment of the invention. As illustrated in FIG. 3, the collector 120 includes the collecting module 155, the policy client module 160, and one or more flow structures 390. The collecting module 155 includes the flow record receiving process 356 and the flow aggregation process 358. The policy client module 160 includes the policy engine 322, and the policy action transmission module 356. Each of these will be described in greater detail later herein.

With reference to FIG. 3, at operation 5.1, the flow record receiving process 356 of the collecting module 155 receives the flow record(s) transmitted from the exporting module 145. Sometime after receiving the flow record(s), at operation 5.2, the flow aggregation process 358 aggregates those flow record(s). The flow record(s) will be aggregated based on the flow record identifier included in the flow record and the flow network element from which the flow record was received. For example, the flow collector 120 may periodically receive flow records for a given flow and update the flow structure(s) 390 to reflect the received flow records. Thus, the collector 120 stores a history of flow records from the participating flow network elements (e.g., the flow network element 110) in the flow structure(s) 390.

Figure 6A:
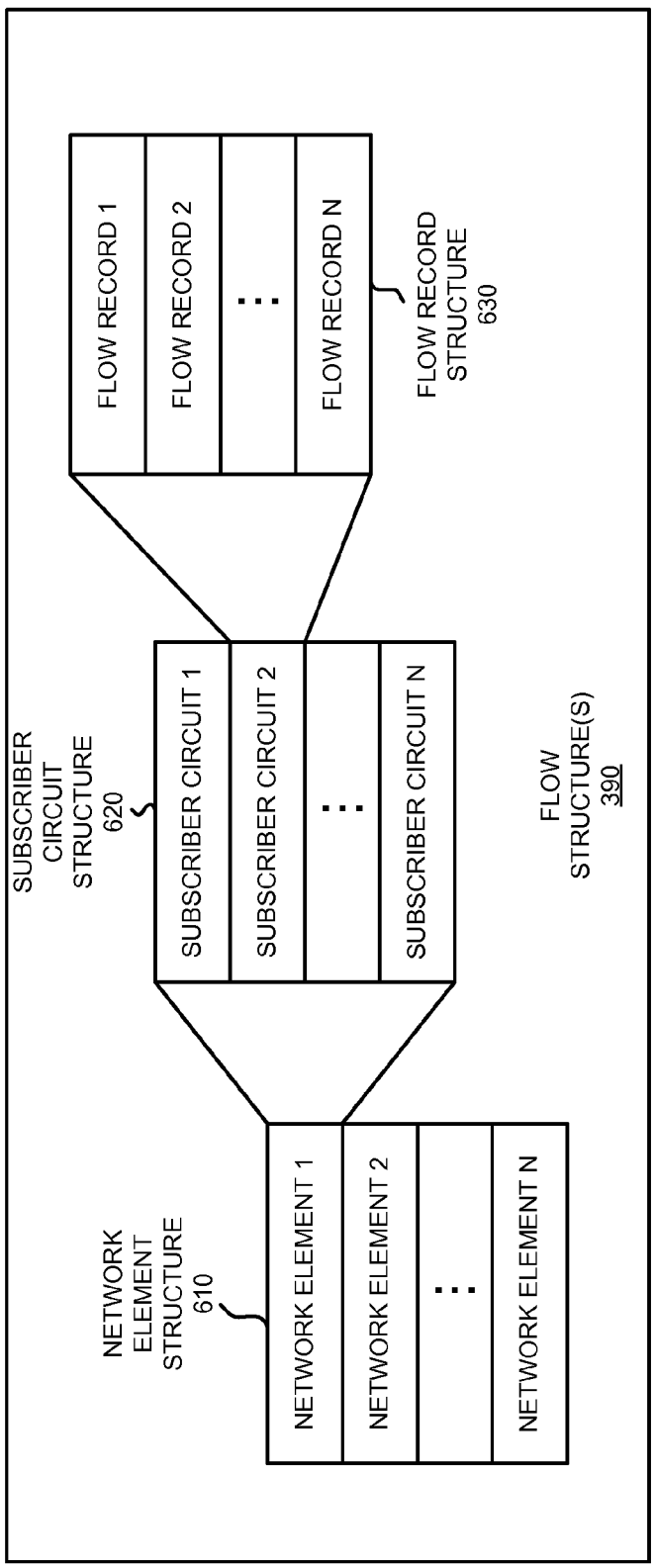
FIG. 6A illustrates exemplary network flow structures according to one embodiment of the invention.

At operation 5.3, the collecting module 155 updates the one or more flow structure(s) 390 with the aggregated records. FIG. 6A illustrates exemplary network flow structures according to one embodiment of the invention. The flow structure(s) 390 include the network element structure 610. The flow network element structure 610 includes N number of entries based on the number of flow network elements the collector is receiving flow records from. Each of the flow network elements entries points to a separate subscriber structure 620. Each subscriber structure 620 includes N number of entries based on the number of unique subscribers having flow records generated from that flow network element. Each entry in the subscriber structure 620 points to a flow record structure 630. Each flow record structure 630 includes N number of entries based on the number of flows that a particular subscriber has.

Figure 6B:
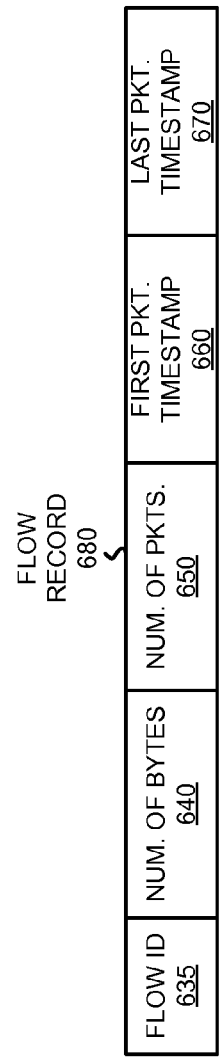
FIG. 6B illustrates an exemplary structure for a flow record according to one embodiment of the invention.

FIG. 6B illustrates an exemplary flow record 680 according to one embodiment of the invention. The flow record 680 includes the flow identifier field 635, the number of bytes field 640, the number of packets field 650, the first packet timestamp field 660, and the last packet timestamp field 670. It should be understood that the last packet timestamp field 670 will be updated each time the flow record is updated.

With reference back to FIG. 1, the policy client module 160 determines to assign a policy action based on one of the flows and/or subscribers. The policy client module 160 also transmits the policy action to the combined AAA and policy server 130. With reference to FIG. 3, at operation 6.1, the policy engine 322 (within the policy client module 160) accesses the flow records stored in the flow structure(s) 390 and determines whether to assign a policy action based on policy definitions (stored in the policy definition structure 324). According to one embodiment of the invention, the policy client module 160 periodically accesses the flow records in the flow structure(s) 390 and correlates those flow records against the policy definitions stored in the policy definition structure 324.

A policy action may be used to indicate a certain action to take on network parameters of a subscriber. The network parameters may include connection attributes (e.g., bandwidth values, access control lists, policing values, etc.) and/or control plane parameters that can directly affect flow accounting and/or flow monitoring (e.g., session-timeout, idle-timeout, tunnel hold-down time, etc.). The affected network parameters may be attributes that are included in the subscriber record of the subscriber and/or local to the flow network element and not included in the subscriber record. By way of examples, the policy actions may modify a connection rate associated with the subscriber (e.g., increase or decrease a download or upload rate), prevent packets from a given application type (e.g., SMTP packets, TCP packets, FTP packets), throttle packets from a given application type (e.g., SMTP packets, TCP packets, P2P packets), etc.

For example, FIG. 7 illustrates an exemplary policy definition structure 324 according to one embodiment of the invention. The policy definition structure 324 includes a name field 710, a rule field 720, and a policy action field 730. As illustrated in FIG. 7, the policy definition structure 724 includes a policy definition for a denial of service (DoS) attack. For example, a rule may identify a subscriber as a DoS attacker if the subscriber is transmitting a large number of TCP SYN messages per second without establishing a connection (of course, it should be understood that a DoS attack may be identified in other ways). Once that rule is violated for a given flow, the policy action field 730 indicates that the flow network element should drop all packets from that subscriber (from the source IP address of that subscriber). As another example, a rule may identify a subscriber as a DoS victim if a large number of TCP SYN messages per second are being received by the subscriber. If that rule is violated, the policy action field 730 indicates that the flow network element should filter out all TCP SYN packets destined for the subscriber. As yet another example, a rule may identify a subscriber as a spammer (someone who sends large amounts of unsolicited email) if the subscriber is transmitting a large number of SMTP messages per second. If this rule is violated, the policy action field 730 indicates that the flow network element should bring down the subscriber. It should be understood that a network flow may simultaneously be violating multiple policy definitions.

It should be understood that the policy definitions illustrated in FIG. 7 are exemplary, and other, alternative policy definitions may be used with embodiments of the invention described herein (e.g., P2P (peer-to-peer) application policy definitions, other applications which use a relatively large amount of bandwidth and can be identified in terms of network flows, etc.). In some embodiments of the invention policy definitions may be defined to include billing policy definitions such as "flow-based billing" and/or "time-based billing". Flow-based billing may be used for those applications that need a relatively high level of QoS and a relatively small amount of latency (e.g., VoIP, IPTV, interactive gaming, etc.). These applications may be billed at a different rate than less critical applications such as web browsing. Time-based billing may be used to charge subscribers differently depending on the time of day the usage is occurring. For example, peak hour usage may be billed more than usage at non-peak hours. It should be understood that the network traffic of the subscribers that meet billing policy definitions will not be affected beyond what the subscribers are billed for that network traffic.

In one embodiment of the invention an operator of the network flow management system (e.g., an operator of a participating flow network element) configures the policy definitions stored in the policy definition structure. For example, each flow network element participating in the network flow management system 100 that exports flow records to the collector may have a different policy definition structure. That is, the network flow policies for one network element are not necessarily the same as the network flow policies of another network element.

Sometime after the policy engine 622 determines that a flow record from a subscriber (e.g., the subscriber computer end station 105) has met a rule and triggered the application of a policy action, at operation 6.2 the policy engine assigns the policy action as indicated by the policy definition structure 324. It should be understood that a single flow record may trigger the application of multiple policy actions. Sometime later, at operation 6.3, the policy action transmission module 356 transmits the policy action(s) to the combined AAA and policy server 130.

Referring back to FIG. 1, the policy server module 132 of the combined AAA and policy server 130 receives the policy action(s) transmitted by the policy client module 160, and assigns policies to the subscriber records based on those policy action(s) and the flow policies 137. With reference to FIG. 4, at operation 7.1, the policy server module 135 receives the policy action(s) transmitted from the policy client module 160. At operation 7.2, the policy server module 135 assigns one or more policies based on the policy action(s) and the flow policies 137. The flow policies 137 include one or more flow admission control profiles 450, and one or more flow template(s) 440. A flow admission control profile includes policies taken at a subscriber level. That is, a flow admission control profile typically will affect the network resources of all flows associated with a subscriber. In contrast, a flow template is a policy at the flow level. For example, a flow template will affect a single flow associated with a subscriber. It should be understood that one or more flow templates may be applied to a single subscriber. In addition, a flow admission control profile may be applied to a subscriber either alone, or in conjunction with, one or more flow templates.

Figure 8:
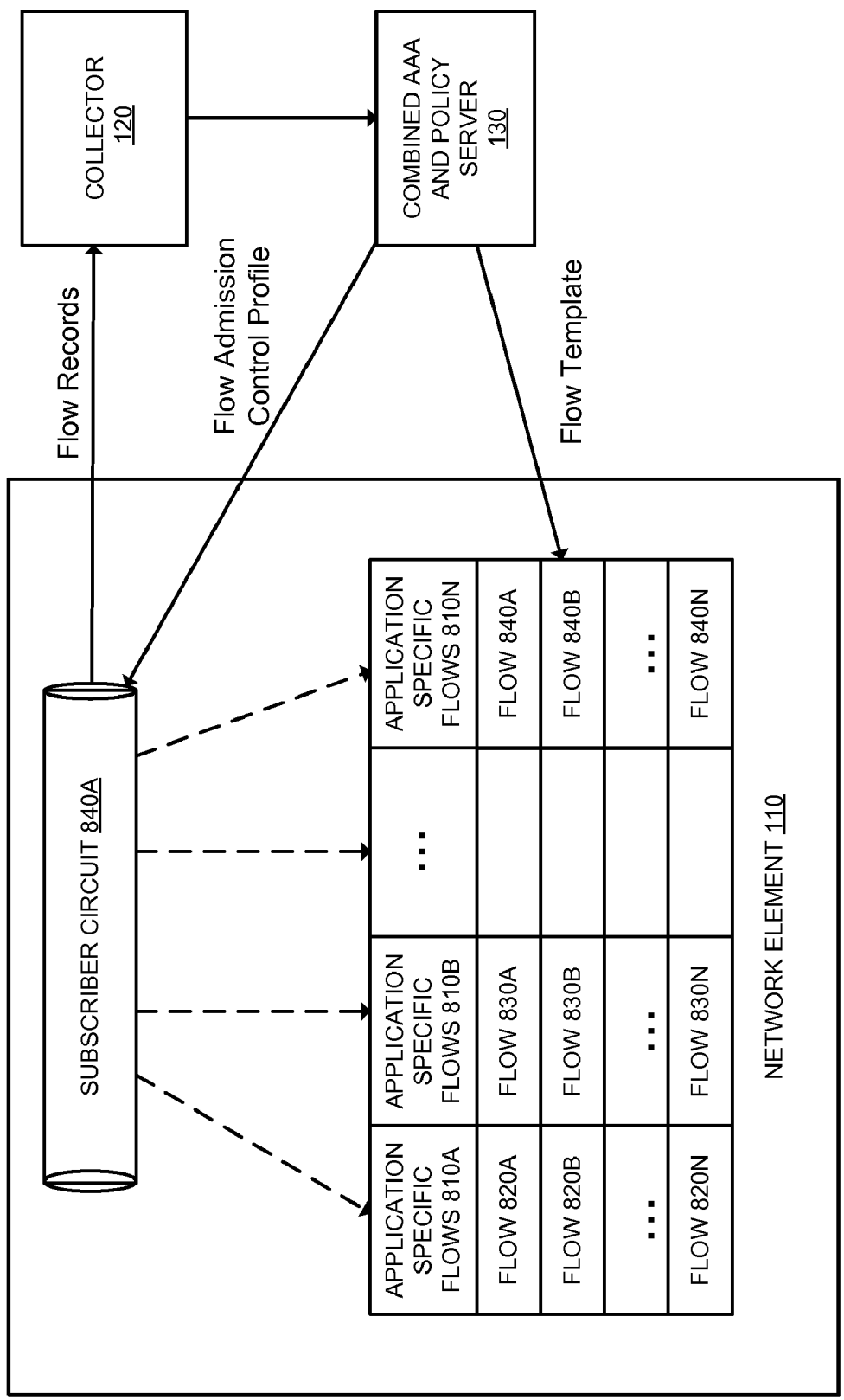
FIG. 8 is a conceptual diagram illustrating a network flow management system according to one embodiment of the invention.

FIG. 8 is a conceptual diagram illustrating the application of policies on a subscriber circuit in a network flow management system according to one embodiment of the invention. As illustrated in FIG. 8, the flow network element 110 includes the subscriber circuit 840. The subscriber circuit 840 is assigned to one subscriber (e.g., the computer end station 105). The application specific flows 810A-810N are flowing on the subscriber circuit 840. Each of the application specific flows 810A-810N include a number of flows. For example, the application specific flows 810A-810N include the flows 420A_A-420N_A through 420A_N-420N_N respectively. Although not illustrated, an observation point has been programmed on the subscriber circuit 840.

The network element 110 transmits flow records corresponding to the subscriber circuit 840 to the collector 120. As described above, the collector organizes the flow records, determines whether an identified flow violates a policy definition, and transmits policy actions to the combined AAA and policy server 130. The combined AAA and policy server 130 applies a flow admission control profile and/or a flow template to a subscriber. As illustrated in FIG. 8, the combined AAA and policy server 130 assigns a flow admission control profile for the subscriber circuit 840, and a flow template for the flow 840B_N.

According to one embodiment of the invention, the policy(ies) assigned to a particular subscriber are stored in the subscriber record for that subscriber. Thus, with reference to FIG. 4, sometime after assigning the policy(ies) for the subscriber, at operation 7.3, the subscriber record corresponding with that subscriber is updated with the assigned policy(ies). At operation 7.3, the policy server module 135 notifies the AAA server module 132 of the updated subscriber record. Sometime later, at operation 8, AAA server module 132 transmits the policy(ies) to the flow network element terminating the subscriber (e.g., the flow network element 110). While in one embodiment of the invention the entire subscriber record for the subscriber is transmitted to the flow network element, in alternative embodiments of the invention only the policy(ies) are transmitted to the flow network element. According to one embodiment of the invention the policy(ies) are transmitted via vendor specific attribute(s) (VSAs) included in AAA message(s).

Referring back to FIG. 1, the flow network element 110 receives the policy(ies) transmitted from the combined AAA and policy server 130, and at operation 9, installs those policy(ies). The installation process is described with more detail with reference to FIG. 2. With reference to FIG. 2, at operation 9.1, the AAA client module 150 receives the policy(ies) transmitted from the combined AAA and policy server 130. Similarly as described with reference to operation 2.2, at operation 9.2, the circuit mapping process 220 maps the subscriber identifier (included with the transmission of the policy(ies)) to the circuit identifier associated with that subscriber identifier. After the subscriber circuit for the subscriber is identified, the policy(ies) are passed to the flow management component installation module 230 for installation. After determining that those policy(ies) are supported by the flow network element 110, the flow management component installation module 230 installs those policy(ies) (operation 9.4). In addition, the flow management component installation module 230 updates the subscriber record for the subscriber to reflect those policy(ies).

Certain network flow policies may cause an alarm to be raised in the flow network element 110. For example, an alarm may be raised if a particular subscriber is to be removed from the system (e.g., if that subscriber has been sending large amounts of unsolicited emails). The network flow policies that are applied on a network flow network element may be logged.

Referring back to FIG. 1, at operation 10, the observation and metering module 140 takes action according to the policy(ies). For example, if a policy restricts the type of packets that can be sent by the subscriber computer end station 105, the observation and metering module 140 may drop those packets it observes on the subscriber's corresponding subscriber circuit that are restricted.

As one example, the network flow management system 100 may be used to adaptively manage the bandwidth for VoIP subscribers. Since VoIP flows need guaranteed bandwidth (so calls are not dropped and there an acceptable amount of latency), typical network elements reserve bandwidth in advance and use the bandwidth as necessary. It should be understood that this may lead to an inefficient use of bandwidth because if the full amount of bandwidth is not being used, that bandwidth cannot be used for other purposes. However, in embodiments of the invention described herein, bandwidth may be adaptively managed.

For example, the flow network element 110 observers VoIP flows and exports VoIP flow records to the collector 120 (specifically the collecting module 155). The VoIP flow records may include the source and destination IP address, the source and destination port, the protocol being used, QoS requirements, etc. The collecting module 155 identifies the VoIP flows and organizes those VoIP flows according to subscribers. In addition to the VoIP flows, the collecting module 155 also receives and organizes flow records for other applications. The collecting module 155 stores the flow records and is able to determine which flows (which non-VoIP flows) (thus which subscribers) relatively use the most bandwidth over a period of time (e.g., based on the number of packets and/or bytes transmitted/received over a given time). For example, P2P (peer to peer) flows commonly use a relatively large percentage of available bandwidth. The collecting module 155 may also keep track of the bandwidth usage on the flow network element 110 (the flow network element 110 may periodically transmit the current bandwidth to the collector 120). The collecting module 155 can detect that the flow network element 110 cannot accommodate a new VoIP flow based on the current bandwidth usage and can select one or more of the non-VoIP flows using a large percentage of bandwidth and notify the policy client module 160 to assign a policy action to those non-VoIP flows to reduce the bandwidth of those selected non-VoIP flows. The policy client module 160 transmits the policy action(s) to the combined AAA and policy server 130 which assigns a policy for those flows (e.g., using a flow template 440 or a flow admission control profile 450) and transmits the policy to the flow network element 110. Using this process, the flow network element 110 may adaptively manage the bandwidth to better utilize bandwidth on the flow network element 110. Of course, it should be understood that this is but one example, and many other applications are contemplated by embodiments of the invention described herein.

Installed network flow policies may be removed in numerous ways. For example, an operator may remove any installed network flow policies. As another example, in one embodiment of the invention, certain policies (e.g., certain ones of the flow template(s) 440 and/or certain ones of the flow admission control profile(s) 450) include termination parameters. For example, the flow policy termination parameters may be time based (e.g., remove the application of the policy after a given time), event based (e.g., if what caused the violation of the policy rule has ceased), counter based (e.g., remove the application of the policy after a N number of packets, flows, or violating flows are processed), etc.

While embodiments of the invention have described the flow network elements (e.g., the flow network elements 110, 112, and 114), the collector 120, and the combined AAA and policy server 130 being separate entities, in alternative embodiments of the invention one or more of these components are located within the same entity (e.g., a flow network element may be combined with a collector and/or a combined AAA and policy server, a collector may be combined with a combined AAA and policy server, etc.).

While embodiments of the invention have described the combined AAA and policy server 130 being a combined AAA server and a policy server, in alternative embodiments of the invention the AAA server is separate from the policy server.

In some embodiments of the invention, the policy client module is a separate entity from the collector (e.g., the policy client module 160 is located in a separate entity than the collector 120). In these embodiments, the collector periodically transmits the aggregated flow records to the policy client module 160.

In one embodiment of the invention the flow network element 110 includes a one or more control cards and a plurality of line cards. The observation points are programmed on packet processing units (e.g., packet processing ASIC(s) (PPAs), packet processing cores, etc.) of the line cards. Typically, a subscriber circuit is associated with a single line card. As described above, in some embodiments of the invention, the subscribers are mobile subscribers (e.g., subscribers using mobile IP, WiFi, WiMAX, GSM, CDMA, etc.). Since the subscribers are mobile and may physically move locations, their subscriber connection may move on the flow network element. For example, mobile subscribers are typically coupled with a base station that is coupled with a certain line card of the flow network element. Movement of the mobile subscriber may cause the subscriber to be coupled with a different base station that may be coupled with a different line card of the flow network element. In embodiments of the invention, the flow network element dynamically changes the observation points for the mobile subscribers when necessary (e.g., if the subscriber moves from one physical point on the flow network element (e.g., line card, port, etc.) to another during the lifetime of a session.

In addition to observing subscriber network flows, in some embodiments of the invention observation points are programmed on a flow network element to monitor flows associated with other network elements. Similar as observing flows associated with subscribers, policies may be applied to the flows associated with other network elements with embodiments of the invention described herein.

Thus, unlike typical network flow monitoring techniques, embodiments of the invention include monitoring network flows at the subscriber-level and the logical circuit-level, and actions (flow policy actions) may be taken at the subscriber-level based on the monitored flow. Thus, network flow records may be generated for individual subscribers and actions may be taken for those subscribers based on their individual flow records. This allows for a more granular monitoring and management of network flows.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed by a flow network element in a network flow management system, the method comprising the flow network element performing the steps of:
monitoring network flows at a subscriber-level for a plurality of subscribers;
exporting flow records corresponding to monitored network flows to a collector by an exporting module, wherein the exporting module is coupled with an observation and metering module, the flow records associated with the plurality of subscribers, wherein each flow record includes an identification of which one of the plurality of subscribers the flow record belongs, wherein the collector is coupled with a plurality of flow network elements, the collector including
a collecting module and a policy client module,
the collecting module to receive the transmitted flow records and organize the received network flow records, and
the policy client module coupled with the collecting module, the policy client module to create policy actions based on the organized network flow records and a plurality of policy definitions, and to transmit those policy actions to a policy server, wherein each policy action includes an indication of which one of the plurality of flow network elements and which subscriber the policy action is for;
receiving one or more flow policies from a combined authentication, authorization, and accounting (AAA) and policy server that were assigned by applying the exported flow records against a plurality of policy rule definitions at a policy client module of the collector, wherein each received flow policy identifies an action to take on network parameters associated with one of the plurality of subscribers as a result of violating one or more policy rules; and
applying the one or more flow policies, wherein each applied flow policy modifies at least some of the network parameters associated with one of the plurality of subscribers.

2. The method of claim 1, wherein the network parameters include connection attributes including one or more of bandwidth values, access control lists, and policing values.

3. The method of claim 1, wherein at least two flow policies are received and applied, and wherein at least one of the applied flow policies affects all network traffic of a first subscriber, and wherein at least one other of the applied flow policies affects only a single network flow of a second subscriber.

4. The method of claim 1, wherein at least one of the plurality of subscribers is a mobile subscriber and at least one of the plurality of subscribers is a fixed subscriber.

5. The method of claim 1, further comprising:
for each of the plurality of subscribers, receiving an observation profile associated with the subscriber from the combined AAA and policy server, the observation profile indicating network flow monitoring parameters for the subscriber; programming a plurality of subscriber-level flow observation points according to the received observation profiles.

6. The method of claim 5, wherein the observation profiles are received as part of an authentication or re-authentication request from the subscribers, and wherein the observation profiles are associated with subscriber records associated with the subscribers.

7. The method of claim 5, wherein the network flow monitoring parameters of each observation profile indicate which ones of a plurality of network flows associated with the subscriber to monitor.

8. A network flow management system, comprising:
a plurality of flow network elements, each of the flow network elements including:
an authentication, authorization, and accounting (AAA) client module to receive, from a AAA server, observation profiles associated with subscribers and to program observation points associated with the subscribers based on the observation profiles,
an observation and metering module coupled with the AAA module, the observation and metering module to observe network flows based on the programmed observation points, and
an exporting module coupled with the observation and metering module, the exporting module to transmit network flow records corresponding to the observed network flows to a collector;
the collector coupled with the plurality of flow network elements, the collector including
a collecting module and a policy client module,
the collecting module to receive the transmitted flow records and organize the received network flow records, and the policy client module coupled with the collecting module, the policy client module to create policy actions based on the organized network flow records and a plurality of policy definitions, and to transmit those policy actions to a policy server, wherein each policy action includes an indication of which one of the plurality of flow network elements and which subscriber the policy action is for;

a combined AAA and policy server, the combined AAA and policy server coupled with the collector and the plurality of flow network elements, the combined AAA and policy server including a AAA server and a policy server, the policy server including a plurality of network flow policies, the combined AAA and policy server to perform the following:

assign network flow policies to the plurality of flow network elements based on the received policy actions, and transmit the assigned network flow policies to the flow network elements as indicated by the policy actions; and wherein each flow network element that receives a network flow policy is to install that network flow policy, wherein the installed network flow policies modify network parameters of subscribers.

9. The network flow management system of claim 8, wherein each observation profile includes a set of one or more network flow monitoring parameters for a particular subscriber and each programmed observation point is a subscriber-level flow observation point.

10. The network flow management system of claim 8, wherein the network parameters modified include one or more of connection attributes including bandwidth values, access control lists, and policing values.

11. The network flow management system of claim 8, wherein the combined AAA and policy server assigns flow policies that affect all network traffic of the subscribers.

12. The network flow management system of claim 8, wherein the combined AAA and policy server assigns flow policies that affect only certain flows of the subscribers.

13. The network flow management system of claim 8, wherein at least one of the plurality of subscribers is a mobile subscriber and at least one of the plurality of subscribers is a fixed subscriber.

14. The network flow management system of claim 8, further comprising the AAA server to update subscriber records for those subscribers that have been determined to be violating a policy rule to reflect the policy action.

15. The network flow management system of claim 8, further comprising the AAA server to transit the observation profiles upon request from the plurality of flow network elements.

16. A method for a network flow management system including one or more flow network elements, a collector coupled with the one or more network elements, a policy client coupled with the collector, a policy server coupled with the policy client, and an Authentication, Authorization, and Accounting (AAA) server coupled with the policy server and the one or more flow network elements, the method comprising:

each of the one or more flow network elements terminating a plurality of subscribers, each flow network element, performing the following:

receiving, from the AAA server, a plurality of observation profiles each associated with a subscriber terminated on that flow network element and each indicating network flow monitoring parameters for a subscriber, programming a plurality of observation points according to the received observation profiles, monitoring network flows at the programmed observation points, and exporting flow records corresponding with the monitored network flows to the collector;

the collector organizing those network flow records by flow network element and subscriber;

the policy client correlating the organized flow records against a plurality of policy definitions to determine whether the network flows of the subscribers violate any policy rules and one or more actions to take for each violation, wherein responsive to determining that a network flow of a subscriber has violated a policy rule, transmitting one or more policy actions to a policy server for that subscriber, each transmitted policy action including an indication of which one of the one or more flow network elements and which subscriber the policy action is for;

the policy server to assign network flow policies for the subscribers based on the policy actions received from the policy client, wherein each network flow policy will modify network parameters of a subscriber;

the AAA server to transmit the assigned network flow policies to the one or more flow network elements; and the one or more flow network elements installing the network flow policies.

17. The method of claim 16, wherein each programmed observation point is a subscriber-level flow observation point unique to a single subscriber, and wherein the network flow monitoring parameters.

18. The method of claim 16, wherein the network flow monitoring parameters include one or more network flow types, one or more application types, and one or more sub-application types.

19. The method of claim 16, wherein the modified network parameters include one or more of connection attributes including bandwidth values, access control lists, and policing values.

20. The method of claim 16, wherein the network flow policies include flow admission control profiles and flow templates, wherein each flow admission control profile affects all network traffic of a single subscriber, and wherein each flow template affects only a single flow of a single subscriber.

21. The method of claim 16, wherein each flow network element terminates mobile subscribers and fixed subscribers.

22. The method of claim 16, wherein the collector and the policy client are implemented on a first network element, and the AAA server and the policy server are implemented on a second network element.

23. The method of claim 16, wherein the collector, policy client, AAA server, and the policy server are implemented on a same network element.

24. The method of claim 16, wherein the collector is implemented on a first network element, the policy client is implemented on a second network element, the AAA server is implemented on a third network element, and the policy server is implemented on a fourth network element.

* * * * *

UNITED STATES PATENT AND TRADEMARK OFFICE
CERTIFICATE OF CORRECTION

PATENT NO.        : 8,274,895 B2                                    Page 1 of 1
APPLICATION NO.   : 12/360080
DATED             : September 25, 2012
INVENTOR(S)       : Rahman et al.

It is certified that error appears in the above-identified patent and that said Letters Patent is hereby corrected as shown below:

On the title page, item (56), under "OTHER PUBLICATIONS", in Column 2, Line 8,
below "28 pages.",
insert --"Benefits of Flow Analysis Using sFlow®: Network Visibility, Security and Integrity", A Lancope Technical White Paper, Lancope, Inc., 2008, 12 pages.--.

Signed and Sealed this
Twelfth Day of February, 2013

Teresa Stanek Rea
*Acting Director of the United States Patent and Trademark Office*